United States Patent Office 2,779,674
Patented Jan. 29, 1957

2,779,674

METHOD OF REMOVING COPPER FROM BRAZED JOINTS

Arthur T. Cape, Los Angeles, Calif., assignor to Superweld Corporation, North Hollywood, Calif., a corporation of California No Drawing. Application June 18, 1954, Serial No. 437,871

5 Claims. (Cl. 75—101)

This invention relates generally to the removal of copper from brazed joints without attacking the steel parts which have been joined by brazing.

In copper brazing, the brazing very often is not entirely satisfactory, and in such cases, it becomes necessary to remove the copper from the joints, and to rebraze the parts.

Heretofore, a mixture of chromic acid and sulphuric acid has been used for this purpose. The attack by such a mixture is slow, and the parts cannot be readily rebrazed, due to the formation of oxides on the surfaces of the steel parts.

As the result of considerable experimentation, I have discovered that the addition of a soluble salt of gold will preferentially permit the attack of copper in the presence of iron, when nitric acid is used as the attacking agent. More specifically, I have discovered that by using nitric acid to remove copper from brazed joints, I can inhibit the attack of the steel parts by the nitric acid by adding a relatively small amount of a soluble salt of gold to the nitric acid as an inhibitor agent.

I prefer to use, as the soluble salt of gold, that known as gold chloride or auric chloride ($HAuCl_4.3H_2O$), since I have found that the use of this compound, as the inhibitor, leaves the surfaces from which the copper has been removed in a condition in which they are highly susceptible to a brazing operation, either with copper or with NiSiB alloys, or with other brazing alloys, such as silvers, solders, etc.

In accordance with the invention, a series of tests was conducted, using auric chloride ($HAuCl_4.3H_2O$) as the inhibiting agent. These tests were as follows:

(1) A sample comprising steel parts joined or brazed together by means of copper was swabbed with a 5% solution of the gold chloride, and permitted to stand for about two hours. The sample was then baked at 280° C. for about 30 minutes, and was then treated with a solution consisting of 50 cc. of concentrated nitric acid and 1 cc. of 25% sodium nitrite solution. This produced a reaction with the copper at 60° C., but the iron did not readily react. The iron did begin to react once when the sample was lifted out of the solution, but the reaction ceased on reimmersion. The solution was heated to 84° C., and the sample scratched with a glass thermometer, without producing a reaction, but reaction of the iron began when it was scratched with an iron forceps at this temperature.

(2) A sample similarly prepared, i. e., swabbed with a 5% solution of gold chloride, then permitted to stand for about two hours, and baked at 280° C. for about 30 minutes, was similarly treated with 50 cc. of concentrated nitric acid (to which no sodium nitrite was added), showed reaction of the copper at about 67° C. Sodium nitrite solution was later added, and the iron reacted at about 85° on being scratched with the thermometer.

(3) A sample was swabbed with the 5% gold chloride solution and then placed in the nitric acid-sodium nitrite solution described above. The sample was a larger one than in (1) and (2), so a larger quantity of the nitric acid-sodium nitrite solution was used. The copper began to react at 57° C. and soon dissolved. The iron began to react at 76° C.

(4) A small portion of the solid gold chloride ((approximately 25 mg.) on the end of a spatula was dissolved in ½ cc. of water, and 50 cc. of concentrated nitric acid was added. The sample was immersed in this solution, and then 1 cc. of the 25% sodium nitrite solution added. The approximate gold concentration was 250 mg. Au per liter. The copper began to react at 57° C. The solution was boiled, and the temperature raised as high as 105° C., without the iron reacting. Some fuming nitric acid, and 20 additional cc. of concentrated nitric acid were added, and a slight reaction with the iron began, but stopped very quickly. No further reaction occurred, even when the sample was scratched with an iron forceps.

(5) Another experiment similar to (4) was carried out, and again no reaction of the iron occurred at 105° C. Addition of a second sample to the same solution produced no reaction of the iron either, only the copper being dissolved. Addition of still a third sample to the solution at first produced only a reaction of the copper, but then suddenly all three pieces began to be attacked. At this point, another small portion of solid gold chloride was dropped in, and the reaction of the iron, which had been very vigorous, ceased, even though the temperature was still over 100° C. This last experiment, of stopping such a reaction, was repeated two or three times, with the same result.

The foregoing experiments led to the following general conclusions:

(1) No inhibitor is required in connection with stainless steel pieces, since stainless steel is unattacked by boiling concentrated nitric acid.

(2) Fuming nitric acid is only a very slightly better passivating agent than ordinary concentrated nitric acid; nor do various other oxidizing agents have an additional effect.

(3) The presence of nitrogen oxides in the acid is desirable, but the acid should be kept concentrated, to prevent attack on the iron at too low a temperature.

(4) Once attack on the iron had begun (except as indicated in the experiments on treatment with gold chloride), it did not stop, unless the sample was removed and placed in fresh cold concentrated nitric acid, or in water. Such a reaction, occurring with a large quantity of iron, would probably be uncontrollable if the iron were left in the solution.

(5) The presence of sufficient gold in the concentrated nitric acid inhibits entirely the attack on the iron, though not on the copper, and the addition of more gold to a solution in which reaction of the iron has begun causes the reaction to cease, even if the acid is boiling.

A series of tests were then conducted in order to determine the approximate amount of gold required to prevent attack of the steel by nitric acid in copper brazed samples. For these tests, auric chloride, in the form $HAuCl_4.3H_2O$, was used in a solution containing approximately 0.20 g. of the solid per drop of solution, which is equivalent to approximately 0.010 g. gold per drop of solution. This relatively high concentration was used, to avoid too much dilution of the acid. These tests were as follows:

(1) 50 cc. concentrated nitric acid, 1 cc. 25% $NaNO_2$ solution, 1 drop Au solution. The iron reacted at 90° C. Reaction stopped upon addition of 3 drops Au solution.

(2) 50 cc. concentrated nitric acid, 1 cc. 25% $NaNO_2$ solution, 2 drops Au solution. The iron did not react at 90° C., although a "wave" of reaction with the acid passed over it a few times.

(3) 50 cc. concentrated nitric acid, 1 drop Au solution. No NaNO₂ solution. The iron did not react at 95° C., but did begin to react when 19 drops (approximately 1 cc.) of water had been added, a drop at a time. Reaction of the iron stopped on further addition of 1 drop Au solution.

From these experiments, the conclusion is drawn that less Au is required if the acid has not been diluted, 1 drop (0.010 g. Au) of the Au solution usually being sufficient under the conditions used. If the 50 cc. of acid were diluted by 1 cc. of NaNO₂ solution or of water, 2 drops of Au solution were the bare minimum required, with 3 drops being more satisfactory (0.030 g. Au).

Addition of a second sample to a heated solution containing one sample, plus sufficient Au to inhibit reaction of the iron, sometimes resulted in reaction, while if a third sample was added, reaction of all three samples would result nearly always.

If the acid were diluted with more than 1 cc. of water, greater amounts of Au were required to inhibit reaction of the iron.

It may also be noted that although sufficient Au will inhibit reaction of the iron with boiling acid, some attack of the iron surfaces underneath the copper brazing does occur at these temperatures. This attack is less marked at lower temperatures, and did not occur at all in several cases in which the reaction of the copper was allowed to proceed below 60° C. At these temperatures, the iron does not usually react anyway, unless it is exposed to the air or scratched. Since such reaction of the iron is uncertain, the presence of Au does provide an added safeguard at these lower temperatures.

Although sodium nitrite does have some effect in aiding the passivation of iron, nevertheless, gold chloride has to be present in order to inhibit the reaction entirely. However, the present invention also contemplates the use of sodium nitrite alone, under some conditions, in combination with nitric acid, to inhibit the attack of the nitric acid on the steel. I have found, for example, that if I add to concentrated nitric acid solution 7½% of sodium nitrite, then it is possible to place a part in such solution at a temperature over 100° F., whereby the copper is removed extremely rapidly from the part and the steel is not attacked. The use of gold chloride in this connection aids materially in preventing the attack on the steel when an unusually large amount of copper has been dissolved. In other words, the gold chloride acts as a safeguard, but in the above special situation, the high sodium nitrite concentration, without the presence of gold chloride, is effective in preventing the attack on steel. While the sodium nitrite is effective with nitric acid in the stripping of copper, it cannot be used in cases where the copper must be removed, using, let us say, an eye dropper. In other words, for localized work, it is necessary to use the nitric acid plus gold chloride, the gold chloride acting as a safeguard in the case of nitric acid plus sodium nitrite.

In the experiments which have been described, involving the swabbing of the samples with the gold solution, such a method of treatment has some advantage in cases where copper has gotten into a threaded hole, in which case it is convenient to put the gold chloride into the hole and then add nitric acid with an eye dropper. In general, however, it is advisable to immerse the copper brazed samples in the solution of nitric acid and gold chloride.

In actual practice, I have found that instead of using sodium nitrite, a solution consisting of 400 cc. of nitric acid commercial grade, 100 cc. of water, and 2 cc. of 5% gold chloride solution works very successfully.

The use of gold chloride as an inhibiting agent is also of advantage in many cases where it is desirable to prevent the attack of nitric acid on steels and stainless steels, other than parts which have been copper brazed, particularly in the case of red fuming nitric acid.

Various other inhibiting agents were tried, including salts of rhodium, iridium, palladium, ruthenium, silver and platinum. Of these, only palladium (in the form of PdCl₂) and platinum (in the form of H₂PtCl₆·6H₂O) were found to be effective, but these were somewhat less effective than gold.

It is to be understood that various changes may be made in the method and reagents, as described, without departing from the scope of the invention or the appended claims.

Having thus described my invention, I claim:

1. In a method of treating copper-brazed steel parts to dissolve the copper without attacking the steel, the step which consists in treating the parts with nitric acid and a solution containing gold ions in an amount effective to inhibit the attack of the steel.

2. In a method of treating copper-brazed steel parts, the step which consists in dissolving the copper with nitric acid, while inhibiting attack on the steel by treatment with a solution containing auric chloride in an amount effective to inhibit such attack.

3. The method of passivating steel parts joined together by copper, which consists in treating the parts with nitric acid containing auric chloride in an amount effective to inhibit the attack of the steel, whereby the copper is dissolved without attack of the steel parts.

4. The method which consists in treating steel parts joined together by copper, by means of nitric acid containing a soluble salt of gold in an amount effective to inhibit the attack of the steel, whereby the copper is dissolved without attack of the steel parts.

5. The method of treating copper-brazed steel parts to dissolve the copper without attacking the steel, said method comprising treatment of said parts with nitric acid containing sodium nitrite and auric chloride in solution, the auric chloride being present in an amount that is effective to inhibit the attack of the steel.

References Cited in the file of this patent

FOREIGN PATENTS

509    Great Britain _____ of 1883

OTHER REFERENCES

The London and Edinburgh Philosophical Magazine and Journal of Science, 3rd series. Vol. 9, July-Dec. 1836. Pages 53–66. Articles by Schoenbein and Faraday.

The Corrosion of Metals by Evans, 2nd ed. Published in 1926 by Ed. Arnold & Co., London. Pages 108–123.

The Monthly Review (of the A. E. S.), Mar. 1945. Pages 268–270; July 1945, pp. 672–679 and 719. "Stripping of Copper From Various Base Metals" by Mathers et al.